(12) United States Patent
Sun et al.

(10) Patent No.: US 11,563,612 B2
(45) Date of Patent: Jan. 24, 2023

(54) TRANSMISSION METHOD AND FIRST COMMUNICATION DEVICE

(71) Applicant: VIVO MOBILE COMMUNICATION CO., LTD., Guangdong (CN)

(72) Inventors: Xiaodong Sun, Guangdong (CN); Hao Liu, Guangdong (CN); Peng Sun, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 17/365,298

(22) Filed: Jul. 1, 2021

(65) Prior Publication Data

US 2021/0328845 A1 Oct. 21, 2021

Related U.S. Application Data

(63) Continuation of application No. PCT/CN2019/128533, filed on Dec. 26, 2019.

(30) Foreign Application Priority Data

Jan. 11, 2019 (CN) .......................... 201910028832.7

(51) Int. Cl.
*H04L 27/26* (2006.01)
*H04L 5/00* (2006.01)

(52) U.S. Cl.
CPC ........ *H04L 27/2613* (2013.01); *H04L 5/0048* (2013.01); *H04L 27/2615* (2013.01); *H04L 27/2636* (2013.01)

(58) Field of Classification Search
CPC ................ H04L 5/0048; H04L 5/0094; H04L 27/2613; H04L 27/2615; H04L 27/262; H04L 27/2636
See application file for complete search history.

(56) References Cited

U.S. PATENT DOCUMENTS

| 2018/0278396 A1 | 9/2018 | Yang et al. |
| 2018/0324005 A1 | 11/2018 | Kim et al. |

(Continued)

FOREIGN PATENT DOCUMENTS

| CN | 102055519 A | 5/2011 |
| CN | 108289021 A | 7/2018 |

(Continued)

OTHER PUBLICATIONS

Huawei, HiSilicon, "Evaluation results of PAPR reduction for CSI-RS and DMRS", 3GPP TSG RAN WG1 Meeting #95, Spokane, USA, Nov. 12-16, 2018.

(Continued)

*Primary Examiner* — David B Lugo
(74) *Attorney, Agent, or Firm* — Price Heneveld LLP

(57) ABSTRACT

This disclosure provides a transmission method and a first communication device. The method includes: transmitting, by a first communication device, a target reference signal that belongs to a first type of reference signal in a case that the first communication device receives indication information from a second communication device and the indication information indicates transmission of the first type of reference signal, where a reference signal sequence of the first type of reference signal is generated based on a first characteristic.

20 Claims, 8 Drawing Sheets

---

Transmit a target reference signal that belongs to a first type of reference signal in a case that indication information from a second communications device is received and indicates transmission of the first type of reference signal, where a reference signal sequence of the first type of reference signal is generated based on a first characteristic — 301

(56) References Cited

U.S. PATENT DOCUMENTS

| | | | |
|---|---|---|---|
| 2019/0149377 A1 | 5/2019 | Qu et al. | |
| 2019/0207730 A1* | 7/2019 | Park | H04L 5/0091 |
| 2019/0342052 A1 | 11/2019 | Hu et al. | |
| 2020/0127801 A1* | 4/2020 | Sengupta | H04L 27/2614 |
| 2021/0258197 A1* | 8/2021 | Liang | H04L 5/0048 |
| 2021/0344534 A1* | 11/2021 | Qu | H04L 27/261 |

FOREIGN PATENT DOCUMENTS

| | | |
|---|---|---|
| CN | 108833070 A | 11/2018 |
| CN | 109039978 A | 12/2018 |

OTHER PUBLICATIONS

Qualcomm Incorporated, "Lower PAPR reference signals", 3GPP TSG RAN WG1 Meeting #95, Spokane, WA, USA, Nov. 12-16, 2018.

Qualcomm et al., "Joint proposal on Length-12, length-18, and length-24 CG sequences for pi/2 BPSK" RI-1814205.

Huawei et al. "Sequence design for Pi/2-BPSK DFT-S-OFDM", 3GPP TSG RAN WGI Meeting #95, RI-1814086, Spokane, USA, Nov. 12-16, 2018.

Intel Corporation, "Low PAPR Reference Signals", 3GPP TSG RAN WG1 Meeting #95, R1-1813892, Spokane, USA, Nov. 12-15, 2018.

ZTE, "Discussion on Low PAPR RS", 3GPP TSG RAN WG1 Meeting #95, R1-1812259, Spokane, USA, Nov. 12-16, 2018.

Qualcomm Inc., "Lower PAPR reference signals", 3GPP TSG RAN WG1 Meeting #95, R1-1813898, Spokane, WA, USA, Nov. 12-16, 2018.

\* cited by examiner

| Index No. | Reference CGS-12 | | | | | | | | | | | Auto-correlation shift mean | PAPR (dB) | Cross-correlation mean | Frequency flatness | BLER (SINR= -6 dB) |
|---|---|---|---|---|---|---|---|---|---|---|---|---|---|---|---|---|
| 0  | 0 | 1 | 1 | 1 | 1 | 1 | 1 | 0 | 0 | 0 | 1 | 1 | 0    | 0.98 | 0.3  | 0.3  | 0.09 |
| 1  | 0 | 1 | 1 | 0 | 1 | 0 | 1 | 0 | 0 | 0 | 1 | 1 | 0    | 0.98 | 0.22 | 0.3  | 0.08 |
| 2  | 0 | 1 | 0 | 1 | 1 | 1 | 0 | 1 | 1 | 0 | 1 | 1 | 0    | 1.15 | 0.18 | 0    | 0.1  |
| 3  | 0 | 1 | 0 | 0 | 0 | 1 | 1 | 1 | 1 | 0 | 1 | 1 | 0    | 1.12 | 0.23 | 0.58 | 0.09 |
| 4  | 0 | 1 | 1 | 0 | 1 | 0 | 1 | 1 | 1 | 1 | 0 | 1 | 0    | 1.19 | 0.17 | 0    | 0.09 |
| 5  | 0 | 1 | 1 | 1 | 0 | 1 | 1 | 1 | 0 | 1 | 1 | 1 | 0    | 1.3  | 0.3  | 0    | 0.09 |
| 6  | 0 | 0 | 1 | 0 | 0 | 1 | 1 | 1 | 1 | 1 | 1 | 1 | 0    | 1.03 | 0.16 | 0.82 | 0.09 |
| 7  | 0 | 0 | 0 | 1 | 1 | 1 | 1 | 0 | 0 | 0 | 0 | 1 | 0    | 1.16 | 0.17 | 0.82 | 0.09 |
| 8  | 1 | 0 | 0 | 0 | 0 | 0 | 0 | 0 | 1 | 1 | 1 | 1 | 0    | 1.16 | 0.23 | 0.82 | 0.08 |
| 9  | 1 | 0 | 0 | 0 | 1 | 0 | 0 | 0 | 0 | 0 | 1 | 1 | 0    | 1.15 | 0.21 | 0    | 0.09 |
| 10 | 1 | 0 | 0 | 0 | 0 | 0 | 1 | 1 | 1 | 1 | 1 | 1 | 0    | 1.03 | 0.2  | 0.82 | 0.09 |
| 11 | 0 | 1 | 1 | 0 | 0 | 0 | 0 | 1 | 1 | 0 | 0 | 1 | 0    | 0.75 | 0.16 | 0.58 | 0.08 |
| 12 | 0 | 0 | 0 | 0 | 0 | 1 | 0 | 0 | 0 | 1 | 1 | 1 | 0.17 | 1.21 | 0.23 | 0.58 | 0.1  |
| 13 | 0 | 0 | 0 | 1 | 0 | 1 | 1 | 1 | 0 | 0 | 1 | 1 | 0.17 | 1.04 | 0.21 | 0.58 | 0.1  |
| 14 | 0 | 0 | 0 | 1 | 0 | 0 | 1 | 0 | 1 | 1 | 1 | 1 | 0.17 | 0.91 | 0.23 | 0    | 0.1  |
| 15 | 1 | 1 | 0 | 0 | 0 | 0 | 0 | 1 | 1 | 1 | 1 | 0 | 0    | 0.75 | 0.2  | 0    | 0.1  |
| 16 | 0 | 1 | 0 | 0 | 0 | 1 | 1 | 0 | 1 | 0 | 1 | 1 | 0    | 0.75 | 0.2  | 0    | 0.09 |
| 17 | 1 | 1 | 0 | 1 | 0 | 1 | 1 | 0 | 0 | 0 | 1 | 0 | 0    | 0.75 | 0.21 | 0    | 0.08 |
| 18 | 1 | 0 | 1 | 0 | 1 | 1 | 0 | 1 | 1 | 0 | 1 | 0 | 0.17 | 1.4  | 0.23 | 0.58 | 0.09 |
| 19 | 1 | 0 | 1 | 0 | 0 | 1 | 0 | 1 | 0 | 1 | 1 | 0 | 0.17 | 1.4  | 0.21 | 0.58 | 0.08 |
| 20 | 1 | 0 | 1 | 1 | 0 | 0 | 0 | 1 | 0 | 0 | 0 | 1 | 0.17 | 1.04 | 0.18 | 0.58 | 0.09 |
| 21 | 1 | 0 | 1 | 0 | 1 | 1 | 0 | 1 | 0 | 0 | 0 | 1 | 0.17 | 1.21 | 0.21 | 0.58 | 0.09 |
| 22 | 1 | 0 | 1 | 0 | 0 | 0 | 1 | 0 | 0 | 0 | 0 | 0 | 0.17 | 1.5  | 0.22 | 0.58 | 0.08 |
| 23 | 1 | 1 | 1 | 1 | 0 | 1 | 1 | 1 | 0 | 1 | 0 | 1 | 0.17 | 1.3  | 0.22 | 0.58 | 0.09 |
| 24 | 0 | 0 | 0 | 1 | 0 | 0 | 0 | 1 | 0 | 0 | 1 | 1 | 0.17 | 1.5  | 0.2  | 0.3  | 0.1  |
| 25 | 0 | 1 | 1 | 0 | 0 | 0 | 1 | 0 | 0 | 0 | 0 | 1 | 0.17 | 1.06 | 0.3  | 0.3  | 0.09 |
| 26 | 0 | 0 | 0 | 0 | 1 | 0 | 0 | 1 | 1 | 1 | 0 | 1 | 0.17 | 1.5  | 0.2  | 0.3  | 0.09 |
| 27 | 1 | 0 | 1 | 0 | 0 | 0 | 0 | 1 | 0 | 0 | 0 | 1 | 0.17 | 1.06 | 0.18 | 0.3  | 0.09 |
| 28 | 0 | 0 | 0 | 1 | 0 | 0 | 0 | 1 | 1 | 1 | 1 | 0 | 0.17 | 0.93 | 0.2  | 0.58 | 0.1  |
| 29 | 1 | 1 | 0 | 0 | 0 | 0 | 1 | 0 | 0 | 0 | 1 | 1 | 0.17 | 1.01 | 0.23 | 0.58 | 0.09 |

FIG. 2a

| Index No. | Reference CGS-18 | | | | | | | | | | | | | | | | | | Auto-correlation shift mean | PAPR (dB) | Cross-correlation mean | Frequency flatness | BLER (SINR= -6 dB) |
|---|---|---|---|---|---|---|---|---|---|---|---|---|---|---|---|---|---|---|---|---|---|---|---|
| 0 | 0 | 1 | 1 | 0 | 1 | 1 | 1 | 0 | 0 | 0 | 0 | 0 | 0 | 0 | 1 | 1 | 0 | 0 | 0.04 | 0.82 | 0.19 | 0.47 | 0.1 |
| 1 | 0 | 0 | 0 | 1 | 1 | 1 | 1 | 1 | 0 | 1 | 1 | 0 | 0 | 1 | 1 | 0 | 0 | 0 | 0.04 | 0.92 | 0.24 | 0.33 | 0.1 |
| 2 | 0 | 0 | 0 | 1 | 1 | 1 | 0 | 1 | 1 | 0 | 0 | 0 | 0 | 1 | 1 | 0 | 0 | 0 | 0.04 | 1.01 | 0.22 | 0.51 | 0.11 |
| 3 | 0 | 1 | 1 | 0 | 0 | 0 | 0 | 0 | 1 | 1 | 1 | 0 | 1 | 1 | 0 | 0 | 0 | 0 | 0.04 | 1.17 | 0.22 | 0.47 | 0.11 |
| 4 | 0 | 1 | 1 | 0 | 1 | 0 | 1 | 1 | 0 | 0 | 0 | 0 | 1 | 1 | 0 | 1 | 0 | 0 | 0.04 | 1.2 | 0.22 | 0.57 | 0.1 |
| 5 | 0 | 0 | 0 | 1 | 1 | 0 | 0 | 1 | 0 | 1 | 1 | 0 | 1 | 1 | 0 | 1 | 0 | 0 | 0.04 | 1.23 | 0.2 | 0.74 | 0.1 |
| 6 | 0 | 0 | 0 | 0 | 1 | 0 | 0 | 1 | 0 | 0 | 0 | 1 | 1 | 1 | 1 | 1 | 1 | 1 | 0.04 | 1.06 | 0.17 | 0.75 | 0.1 |
| 7 | 0 | 0 | 0 | 1 | 0 | 0 | 1 | 0 | 0 | 0 | 0 | 0 | 1 | 0 | 1 | 1 | 1 | 1 | 0.04 | 1.23 | 0.19 | 0.74 | 0.1 |
| 8 | 1 | 1 | 0 | 0 | 1 | 0 | 1 | 1 | 1 | 0 | 1 | 0 | 1 | 1 | 1 | 0 | 0 | 1 | 0.04 | 1.11 | 0.18 | 0.75 | 0.09 |
| 9 | 1 | 1 | 1 | 1 | 0 | 0 | 0 | 1 | 0 | 0 | 0 | 1 | 0 | 0 | 0 | 0 | 0 | 1 | 0.04 | 1.18 | 0.2 | 0.75 | 0.1 |
| 10 | 1 | 1 | 1 | 0 | 0 | 0 | 0 | 1 | 1 | 0 | 0 | 1 | 0 | 0 | 0 | 0 | 1 | 1 | 0.04 | 1.18 | 0.2 | 0.75 | 0.1 |
| 11 | 1 | 0 | 1 | 1 | 1 | 0 | 0 | 0 | 1 | 1 | 1 | 0 | 1 | 1 | 0 | 1 | 0 | 1 | 0.04 | 1.06 | 0.17 | 0.75 | 0.09 |
| 12 | 1 | 0 | 1 | 1 | 0 | 1 | 0 | 1 | 1 | 1 | 0 | 0 | 0 | 0 | 1 | 1 | 1 | 0 | 0.04 | 0.77 | 0.15 | 0.28 | 0.1 |
| 13 | 1 | 1 | 0 | 1 | 0 | 1 | 1 | 1 | 1 | 0 | 1 | 0 | 0 | 0 | 0 | 0 | 0 | 1 | 0.11 | 0.8 | 0.2 | 0.33 | 0.1 |
| 14 | 0 | 0 | 0 | 0 | 1 | 1 | 1 | 0 | 1 | 0 | 1 | 0 | 1 | 1 | 0 | 1 | 1 | 0 | 0.04 | 0.7 | 0.18 | 0.33 | 0.09 |
| 15 | 0 | 0 | 1 | 1 | 1 | 0 | 1 | 0 | 1 | 0 | 1 | 1 | 0 | 1 | 0 | 1 | 1 | 0 | 0.04 | 0.77 | 0.2 | 0.33 | 0.1 |
| 16 | 0 | 0 | 1 | 1 | 1 | 0 | 1 | 0 | 0 | 0 | 0 | 0 | 0 | 1 | 0 | 1 | 1 | 1 | 0.11 | 0.78 | 0.19 | 0.33 | 0.1 |
| 17 | 0 | 1 | 0 | 0 | 1 | 0 | 0 | 0 | 1 | 1 | 1 | 0 | 0 | 1 | 1 | 1 | 1 | 1 | 0.04 | 0.77 | 0.18 | 0.33 | 0.09 |
| 18 | 1 | 0 | 1 | 1 | 0 | 1 | 0 | 0 | 0 | 0 | 1 | 1 | 0 | 1 | 0 | 0 | 1 | 1 | 0.04 | 1.19 | 0.19 | 0.66 | 0.09 |
| 19 | 1 | 0 | 1 | 1 | 1 | 0 | 0 | 0 | 1 | 0 | 0 | 1 | 0 | 1 | 0 | 1 | 0 | 1 | 0.04 | 1.19 | 0.19 | 0.66 | 0.1 |
| 20 | 1 | 1 | 1 | 1 | 0 | 0 | 0 | 1 | 1 | 0 | 1 | 1 | 0 | 1 | 0 | 0 | 0 | 0 | 0.04 | 1.18 | 0.22 | 0.64 | 0.1 |
| 21 | 1 | 0 | 0 | 1 | 1 | 0 | 0 | 0 | 0 | 1 | 1 | 0 | 1 | 0 | 0 | 0 | 0 | 1 | 0.04 | 1.18 | 0.18 | 0.64 | 0.1 |
| 22 | 1 | 0 | 0 | 0 | 0 | 0 | 1 | 0 | 1 | 0 | 0 | 0 | 0 | 1 | 1 | 0 | 1 | 1 | 0.04 | 1.23 | 0.16 | 0.64 | 0.09 |
| 23 | 1 | 0 | 0 | 0 | 0 | 1 | 1 | 0 | 1 | 0 | 0 | 1 | 0 | 0 | 0 | 1 | 1 | 1 | 0.04 | 1.23 | 0.23 | 0.64 | 0.1 |
| 24 | 0 | 0 | 0 | 0 | 0 | 0 | 0 | 1 | 0 | 0 | 0 | 1 | 0 | 0 | 0 | 1 | 1 | 1 | 0.04 | 1.35 | 0.19 | 0.35 | 0.1 |
| 25 | 0 | 1 | 0 | 0 | 1 | 0 | 0 | 1 | 1 | 1 | 0 | 0 | 0 | 0 | 0 | 0 | 0 | 0 | 0.04 | 1.35 | 0.16 | 0.35 | 0.1 |
| 26 | 1 | 1 | 0 | 1 | 1 | 0 | 1 | 0 | 0 | 1 | 0 | 0 | 0 | 0 | 0 | 0 | 0 | 1 | 0.04 | 1.15 | 0.16 | 0.69 | 0.1 |
| 27 | 0 | 0 | 0 | 0 | 0 | 0 | 1 | 1 | 0 | 0 | 0 | 1 | 0 | 1 | 1 | 1 | 1 | 0 | 0.19 | 1.31 | 0.16 | 0.05 | 0.1 |
| 28 | 1 | 0 | 0 | 0 | 1 | 0 | 1 | 1 | 0 | 0 | 0 | 0 | 0 | 0 | 0 | 0 | 0 | 1 | 0.19 | 1.31 | 0.18 | 0.05 | 0.1 |
| 29 | 1 | 1 | 1 | 0 | 0 | 0 | 0 | 0 | 0 | 0 | 1 | 1 | 0 | 0 | 0 | 1 | 0 | 0 | 0.19 | 1.31 | 0.22 | 0.05 | 0.11 |

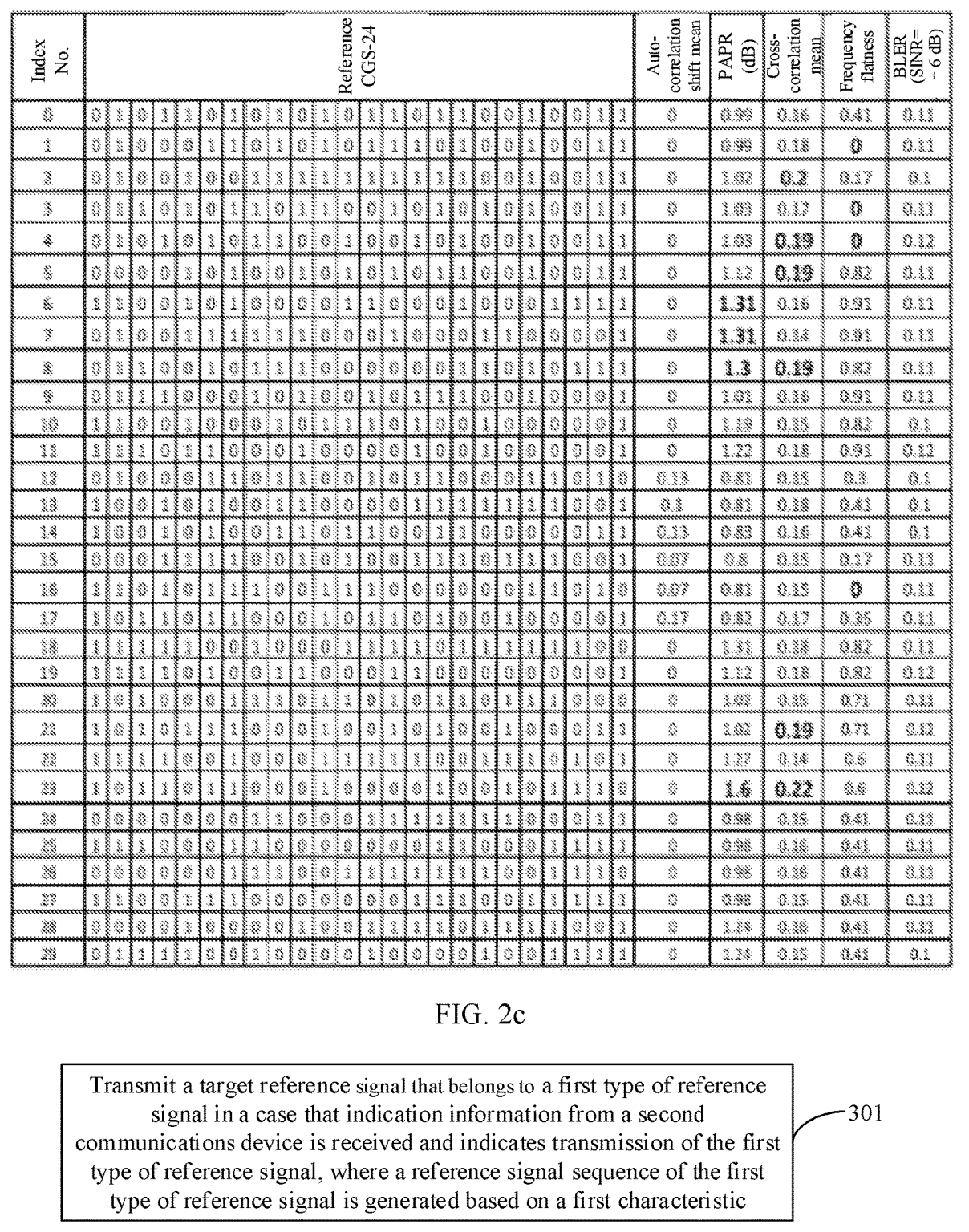

Transmit a target reference signal that belongs to a first type of reference signal in a case that indication information from a second communications device is received and indicates transmission of the first type of reference signal, where a reference signal sequence of the first type of reference signal is generated based on a first characteristic ⟶ 301

FIG. 3

| Index No. | CGS-12 | | | | | | | | | | | | Auto-correlation shift mean | PAPR (dB) | Cross-correlation mean with reference CGS | Frequency flatness | BLER (SINR= −6 dB) |
|---|---|---|---|---|---|---|---|---|---|---|---|---|---|---|---|---|---|
| 0  | 0 | 0 | 1 | 0 | 0 | 1 | 0 | 1 | 0 | 1 | 1 | 1 | 0    | 0.98 | 0.13 | 0.3  | 0.09 |
| 1  | 0 | 0 | 1 | 0 | 1 | 0 | 1 | 1 | 0 | 1 | 1 | 1 | 0.17 | 1.01 | 0.18 | 0.58 | 0.09 |
| 2  | 0 | 0 | 1 | 0 | 1 | 1 | 0 | 1 | 0 | 1 | 1 | 1 | 0.17 | 0.85 | 0.18 | 0.42 | 0.09 |
| 3  | 0 | 0 | 1 | 1 | 0 | 1 | 0 | 1 | 0 | 1 | 1 | 0 | 0    | 1.03 | 0.2  | 0.82 | 0.1  |
| 4  | 0 | 0 | 1 | 1 | 0 | 1 | 0 | 1 | 0 | 1 | 1 | 0 | 0    | 0.98 | 0.2  | 0.3  | 0.09 |
| 5  | 0 | 0 | 1 | 1 | 1 | 1 | 1 | 0 | 1 | 1 | 0 | 0 | 0.17 | 0.85 | 0.18 | 0.42 | 0.08 |
| 6  | 0 | 1 | 0 | 1 | 0 | 1 | 1 | 0 | 1 | 1 | 0 | 0 | 0    | 0.98 | 0.2  | 0.3  | 0.08 |
| 7  | 0 | 1 | 0 | 1 | 1 | 1 | 1 | 0 | 1 | 1 | 0 | 0 | 0    | 0.86 | 0.2  | 0.58 | 0.09 |
| 8  | 0 | 1 | 1 | 0 | 1 | 0 | 0 | 1 | 0 | 1 | 1 | 1 | 0.17 | 0.93 | 0.19 | 0.58 | 0.09 |
| 9  | 0 | 1 | 1 | 1 | 1 | 0 | 0 | 1 | 0 | 0 | 1 | 1 | 0.17 | 0.81 | 0.19 | 0.58 | 0.1  |
| 10 | 0 | 1 | 1 | 1 | 1 | 0 | 1 | 1 | 1 | 0 | 0 | 0 | 0.17 | 0.93 | 0.19 | 0.58 | 0.09 |
| 11 | 0 | 1 | 1 | 1 | 1 | 1 | 0 | 1 | 1 | 0 | 0 | 0 | 0    | 0.98 | 0.2  | 0.3  | 0.09 |
| 12 | 1 | 0 | 0 | 0 | 0 | 1 | 1 | 1 | 1 | 1 | 0 | 1 | 0.17 | 1    | 0.18 | 0.42 | 0.09 |
| 13 | 1 | 0 | 0 | 1 | 1 | 1 | 1 | 0 | 1 | 1 | 0 | 0 | 0.17 | 0.81 | 0.2  | 0.58 | 0.1  |
| 14 | 1 | 0 | 1 | 0 | 1 | 0 | 0 | 1 | 0 | 0 | 1 | 1 | 0    | 0.98 | 0.2  | 0.3  | 0.08 |
| 15 | 1 | 0 | 1 | 0 | 1 | 1 | 0 | 0 | 1 | 0 | 1 | 1 | 0.17 | 1.01 | 0.17 | 0.58 | 0.09 |
| 16 | 1 | 0 | 1 | 0 | 1 | 0 | 1 | 1 | 0 | 0 | 1 | 1 | 0.17 | 1.01 | 0.2  | 0.58 | 0.08 |
| 17 | 1 | 0 | 1 | 1 | 1 | 0 | 0 | 0 | 0 | 1 | 1 | 1 | 0.17 | 0.93 | 0.19 | 0.58 | 0.08 |
| 18 | 1 | 1 | 0 | 0 | 1 | 0 | 0 | 1 | 0 | 1 | 0 | 1 | 0    | 0.98 | 0.2  | 0.3  | 0.09 |
| 19 | 1 | 1 | 0 | 0 | 1 | 0 | 1 | 0 | 1 | 0 | 0 | 1 | 0    | 1.03 | 0.2  | 0.82 | 0.09 |
| 20 | 1 | 1 | 0 | 0 | 1 | 0 | 1 | 0 | 1 | 1 | 0 | 1 | 0.17 | 1.01 | 0.2  | 0.58 | 0.09 |
| 21 | 1 | 1 | 0 | 0 | 1 | 0 | 1 | 0 | 1 | 1 | 0 | 1 | 0.17 | 0.85 | 0.18 | 0.42 | 0.1  |
| 22 | 1 | 1 | 0 | 0 | 1 | 1 | 0 | 0 | 1 | 0 | 0 | 1 | 0.17 | 0.81 | 0.2  | 0.58 | 0.09 |
| 23 | 1 | 1 | 0 | 1 | 0 | 1 | 0 | 1 | 0 | 1 | 0 | 1 | 0.17 | 1    | 0.19 | 0.42 | 0.09 |
| 24 | 1 | 1 | 0 | 1 | 1 | 0 | 1 | 0 | 1 | 0 | 0 | 0 | 0    | 0.98 | 0.13 | 0.3  | 0.09 |
| 25 | 1 | 1 | 0 | 1 | 1 | 1 | 0 | 1 | 0 | 0 | 0 | 0 | 0    | 0.86 | 0.19 | 0.58 | 0.09 |
| 26 | 1 | 1 | 1 | 0 | 0 | 0 | 0 | 1 | 1 | 1 | 0 | 0 | 0    | 1.03 | 0.18 | 0.82 | 0.09 |
| 27 | 1 | 1 | 1 | 0 | 1 | 1 | 0 | 0 | 1 | 1 | 1 | 0 | 0    | 0.98 | 0.19 | 0.3  | 0.08 |
| 28 | 1 | 1 | 1 | 1 | 0 | 0 | 0 | 0 | 1 | 1 | 0 | 1 | 0.17 | 0.85 | 0.19 | 0.42 | 0.08 |
| 29 | 1 | 1 | 1 | 1 | 0 | 0 | 0 | 1 | 0 | 0 | 1 | 1 | 0.17 | 1.01 | 0.18 | 0.58 | 0.08 |

FIG. 4a

| Index No. | CGS-18 | | | | | | | | | | | | | | | | | | Auto-correlation shift mean | PAPR (dB) | Cross-correlation mean with reference CGS | Frequency flatness | BLER (SINR= −6 dB) |
|---|---|---|---|---|---|---|---|---|---|---|---|---|---|---|---|---|---|---|---|---|---|---|---|
| 0 | 0 | 0 | 1 | 0 | 0 | 1 | 1 | 1 | 1 | 1 | 0 | 1 | 1 | 0 | 1 | 0 | 0 | 1 | 0.11 | 0.95 | 0.1 | 0.31 | 0.11 |
| 1 | 0 | 0 | 1 | 0 | 1 | 1 | 0 | 1 | 0 | 1 | 0 | 1 | 1 | 1 | 1 | 0 | 0 | 1 | 0.04 | 0.87 | 0.12 | 0.53 | 0.1 |
| 2 | 0 | 0 | 1 | 0 | 1 | 1 | 0 | 1 | 1 | 0 | 1 | 1 | 0 | 1 | 0 | 1 | 1 | 0 | 0.11 | 0.93 | 0.12 | 0.11 | 0.09 |
| 3 | 0 | 0 | 1 | 0 | 1 | 1 | 0 | 1 | 1 | 1 | 0 | 1 | 1 | 1 | 1 | 0 | 0 | 1 | 0.04 | 0.95 | 0.12 | 0.67 | 0.1 |
| 4 | 0 | 0 | 1 | 1 | 1 | 1 | 1 | 1 | 1 | 1 | 0 | 0 | 1 | 1 | 0 | 0 | 0 | 1 | 0.11 | 0.9 | 0.12 | 0.33 | 0.1 |
| 5 | 0 | 1 | 0 | 0 | 1 | 1 | 1 | 1 | 1 | 1 | 0 | 1 | 1 | 0 | 1 | 0 | 1 | 0 | 0.04 | 0.94 | 0.12 | 0.47 | 0.1 |
| 6 | 0 | 1 | 0 | 1 | 0 | 0 | 1 | 1 | 1 | 0 | 1 | 0 | 1 | 1 | 1 | 1 | 1 | 0 | 0.04 | 0.84 | 0.11 | 0.33 | 0.09 |
| 7 | 0 | 1 | 0 | 1 | 0 | 1 | 1 | 1 | 0 | 0 | 1 | 0 | 1 | 1 | 0 | 1 | 1 | 0 | 0.04 | 0.92 | 0.12 | 0.67 | 0.1 |
| 8 | 0 | 1 | 0 | 1 | 1 | 0 | 1 | 0 | 1 | 0 | 0 | 1 | 1 | 1 | 0 | 1 | 0 | 1 | 0.11 | 0.92 | 0.12 | 0.37 | 0.11 |
| 9 | 0 | 1 | 0 | 1 | 1 | 0 | 1 | 1 | 0 | 0 | 1 | 1 | 1 | 0 | 1 | 0 | 1 | 1 | 0.04 | 0.93 | 0.1 | 0.24 | 0.1 |
| 10 | 0 | 1 | 0 | 1 | 1 | 0 | 1 | 1 | 0 | 0 | 1 | 1 | 1 | 1 | 0 | 1 | 1 | 0 | 0.11 | 0.92 | 0.12 | 0.11 | 0.1 |
| 11 | 0 | 1 | 0 | 1 | 1 | 0 | 1 | 1 | 0 | 1 | 0 | 1 | 1 | 1 | 1 | 1 | 1 | 0 | 0.11 | 0.9 | 0.12 | 0.33 | 0.1 |
| 12 | 0 | 1 | 0 | 1 | 1 | 1 | 1 | 0 | 0 | 1 | 0 | 1 | 1 | 0 | 1 | 0 | 1 | 0 | 0.04 | 0.82 | 0.12 | 0.2 | 0.09 |
| 13 | 0 | 1 | 0 | 1 | 1 | 1 | 1 | 1 | 0 | 0 | 0 | 1 | 0 | 0 | 0 | 1 | 1 | 1 | 0.11 | 0.84 | 0.12 | 0.24 | 0.09 |
| 14 | 0 | 1 | 1 | 0 | 0 | 1 | 1 | 1 | 1 | 0 | 0 | 1 | 0 | 1 | 0 | 0 | 0 | 1 | 0.11 | 0.85 | 0.11 | 0.3 | 0.11 |
| 15 | 0 | 1 | 1 | 0 | 1 | 1 | 0 | 1 | 1 | 0 | 0 | 1 | 1 | 1 | 0 | 0 | 0 | 1 | 0.11 | 0.88 | 0.11 | 0.16 | 0.1 |
| 16 | 0 | 1 | 1 | 1 | 1 | 0 | 1 | 1 | 0 | 0 | 0 | 1 | 1 | 0 | 1 | 1 | 1 | 0 | 0.11 | 0.91 | 0.11 | 0.33 | 0.1 |
| 17 | 0 | 1 | 1 | 1 | 1 | 1 | 1 | 0 | 1 | 0 | 0 | 1 | 0 | 0 | 0 | 1 | 1 | 1 | 0.11 | 0.92 | 0.11 | 0.33 | 0.1 |
| 18 | 1 | 0 | 0 | 1 | 0 | 0 | 1 | 1 | 1 | 1 | 1 | 1 | 0 | 0 | 0 | 1 | 1 | 0 | 0.04 | 0.85 | 0.12 | 0.33 | 0.1 |
| 19 | 1 | 0 | 0 | 1 | 0 | 0 | 1 | 1 | 1 | 1 | 1 | 1 | 0 | 0 | 1 | 1 | 0 | 0 | 0.11 | 0.92 | 0.12 | 0.67 | 0.11 |
| 20 | 1 | 0 | 1 | 0 | 0 | 1 | 1 | 0 | 1 | 0 | 1 | 0 | 0 | 1 | 1 | 0 | 0 | 1 | 0.11 | 0.9 | 0.1 | 0.33 | 0.11 |
| 21 | 1 | 0 | 1 | 0 | 0 | 1 | 1 | 1 | 1 | 1 | 0 | 0 | 1 | 0 | 1 | 1 | 0 | 1 | 0.11 | 0.91 | 0.12 | 0.57 | 0.11 |
| 22 | 1 | 0 | 1 | 0 | 0 | 1 | 1 | 0 | 0 | 1 | 0 | 0 | 1 | 1 | 1 | 1 | 0 | 1 | 0.11 | 0.85 | 0.12 | 0.24 | 0.1 |
| 23 | 1 | 0 | 1 | 0 | 1 | 1 | 0 | 1 | 0 | 1 | 1 | 0 | 1 | 0 | 1 | 0 | 0 | 1 | 0.11 | 0.92 | 0.12 | 0.37 | 0.11 |
| 24 | 1 | 0 | 1 | 1 | 0 | 1 | 1 | 0 | 1 | 1 | 0 | 1 | 0 | 0 | 1 | 1 | 1 | 1 | 0.11 | 0.91 | 0.12 | 0.32 | 0.11 |
| 25 | 1 | 1 | 0 | 0 | 0 | 0 | 1 | 0 | 1 | 1 | 0 | 1 | 0 | 1 | 1 | 1 | 1 | 0 | 0.11 | 0.9 | 0.12 | 0.24 | 0.1 |
| 26 | 1 | 1 | 0 | 1 | 0 | 0 | 1 | 0 | 1 | 0 | 1 | 0 | 0 | 1 | 1 | 1 | 1 | 0 | 0.04 | 0.93 | 0.11 | 0.48 | 0.1 |
| 27 | 1 | 1 | 0 | 1 | 0 | 1 | 1 | 0 | 0 | 0 | 1 | 0 | 1 | 1 | 0 | 1 | 1 | 0 | 0.11 | 0.93 | 0.12 | 0.11 | 0.1 |
| 28 | 1 | 1 | 0 | 1 | 1 | 1 | 0 | 0 | 0 | 0 | 0 | 1 | 1 | 1 | 1 | 1 | 0 | 0 | 0.11 | 0.8 | 0.12 | 0.24 | 0.1 |
| 29 | 1 | 1 | 0 | 1 | 1 | 1 | 0 | 0 | 0 | 0 | 1 | 1 | 0 | 1 | 0 | 1 | 1 | 0 | 0.11 | 0.93 | 0.12 | 0.19 | 0.1 |

FIG. 4b

| Index No. | CGS-24 | | | | | | | | | | | | | | | | | | | | | | | | Auto-correlation shift mean | PAPR (dB) | Cross-correlation mean with reference CGS | Frequency flatness | BLER (SINR= −6 dB) |
|---|---|---|---|---|---|---|---|---|---|---|---|---|---|---|---|---|---|---|---|---|---|---|---|---|---|---|---|---|---|
| 0 | 0 | 0 | 1 | 1 | 1 | 1 | 1 | 0 | 0 | 1 | 1 | 1 | 1 | 0 | 1 | 0 | 1 | 1 | 1 | 0 | 1 | 0 | 1 | 1 | 0.03 | 1.21 | 0.1 | 0.24 | 0.11 |
| 1 | 0 | 1 | 1 | 0 | 0 | 1 | 0 | 0 | 1 | 1 | 1 | 1 | 1 | 0 | 1 | 1 | 1 | 1 | 0 | 1 | 1 | 0 | 1 | 1 | 0.03 | 1.26 | 0.1 | 0.33 | 0.1 |
| 2 | 0 | 1 | 1 | 0 | 1 | 1 | 1 | 1 | 0 | 1 | 1 | 1 | 0 | 1 | 1 | 0 | 1 | 1 | 0 | 1 | 0 | 1 | 1 | 1 | 0 | 1.15 | 0.1 | 0.35 | 0.11 |
| 3 | 0 | 1 | 1 | 0 | 1 | 1 | 1 | 1 | 0 | 1 | 1 | 1 | 0 | 1 | 1 | 0 | 1 | 1 | 0 | 1 | 1 | 0 | 1 | 1 | 0 | 1.26 | 0.1 | 0.41 | 0.11 |
| 4 | 0 | 1 | 1 | 0 | 1 | 1 | 1 | 1 | 1 | 1 | 1 | 1 | 0 | 0 | 0 | 1 | 1 | 1 | 0 | 1 | 0 | 1 | 1 | 1 | 0.03 | 1.26 | 0.1 | 0.41 | 0.12 |
| 5 | 0 | 1 | 1 | 1 | 1 | 1 | 0 | 0 | 0 | 0 | 1 | 1 | 1 | 0 | 1 | 1 | 1 | 1 | 1 | 1 | 1 | 1 | 1 | 1 | 0.07 | 1.23 | 0.1 | 0.41 | 0.14 |
| 6 | 0 | 1 | 1 | 1 | 1 | 1 | 0 | 1 | 1 | 1 | 1 | 0 | 1 | 1 | 1 | 0 | 1 | 1 | 0 | 1 | 0 | 1 | 1 | 1 | 0.07 | 1.19 | 0.1 | 0.51 | 0.11 |
| 7 | 0 | 1 | 1 | 1 | 1 | 1 | 0 | 0 | 1 | 1 | 1 | 0 | 1 | 1 | 1 | 1 | 1 | 1 | 0 | 0 | 1 | 1 | 1 | 1 | 0.07 | 1.21 | 0.1 | 0.25 | 0.11 |
| 8 | 0 | 1 | 1 | 1 | 1 | 1 | 0 | 1 | 1 | 1 | 1 | 0 | 0 | 1 | 1 | 0 | 1 | 1 | 1 | 1 | 1 | 0 | 1 | 1 | 0.07 | 1.15 | 0.1 | 0.35 | 0.11 |
| 9 | 0 | 1 | 1 | 1 | 1 | 1 | 1 | 0 | 0 | 1 | 1 | 1 | 0 | 1 | 1 | 1 | 1 | 0 | 0 | 1 | 0 | 1 | 1 | 1 | 0.07 | 1.21 | 0.09 | 0.25 | 0.11 |
| 10 | 0 | 1 | 1 | 1 | 1 | 1 | 1 | 0 | 0 | 1 | 1 | 1 | 0 | 1 | 1 | 1 | 1 | 0 | 0 | 0 | 1 | 0 | 1 | 0 | 0.07 | 1.12 | 0.09 | 0.3 | 0.13 |
| 11 | 0 | 1 | 1 | 1 | 1 | 1 | 1 | 0 | 0 | 1 | 1 | 1 | 1 | 1 | 1 | 1 | 0 | 0 | 1 | 0 | 1 | 0 | 1 | 0 | 0.07 | 1.25 | 0.09 | 0.41 | 0.13 |
| 12 | 0 | 1 | 1 | 1 | 1 | 1 | 1 | 0 | 1 | 0 | 1 | 1 | 1 | 0 | 0 | 1 | 1 | 1 | 1 | 1 | 0 | 1 | 1 | 1 | 0.07 | 1.07 | 0.1 | 0.41 | 0.11 |
| 13 | 0 | 1 | 1 | 1 | 1 | 1 | 1 | 0 | 1 | 0 | 1 | 1 | 1 | 0 | 1 | 1 | 0 | 1 | 1 | 0 | 1 | 0 | 1 | 1 | 0.07 | 1.22 | 0.1 | 0.11 | 0.12 |
| 14 | 0 | 1 | 1 | 1 | 1 | 1 | 1 | 0 | 1 | 1 | 1 | 1 | 1 | 1 | 1 | 1 | 0 | 0 | 1 | 0 | 1 | 0 | 1 | 0 | 0.07 | 1.18 | 0.1 | 0.3 | 0.13 |
| 15 | 0 | 1 | 1 | 1 | 1 | 1 | 1 | 0 | 1 | 1 | 1 | 1 | 0 | 1 | 1 | 1 | 1 | 0 | 0 | 1 | 0 | 1 | 0 | 0 | 0.07 | 1.22 | 0.1 | 0.15 | 0.12 |
| 16 | 0 | 1 | 1 | 1 | 1 | 1 | 1 | 1 | 1 | 1 | 0 | 1 | 1 | 0 | 1 | 1 | 1 | 0 | 1 | 0 | 0 | 1 | 0 | 1 | 0.07 | 1.22 | 0.1 | 0.17 | 0.14 |
| 17 | 1 | 0 | 0 | 1 | 1 | 1 | 1 | 1 | 0 | 1 | 1 | 0 | 1 | 1 | 1 | 0 | 1 | 1 | 0 | 0 | 0 | 1 | 1 | 1 | 0.07 | 1.17 | 0.09 | 0.12 | 0.11 |
| 18 | 1 | 0 | 0 | 1 | 1 | 1 | 1 | 1 | 1 | 1 | 0 | 0 | 1 | 1 | 0 | 0 | 0 | 1 | 1 | 1 | 1 | 1 | 1 | 1 | 0.03 | 1.13 | 0.1 | 0.51 | 0.12 |
| 19 | 1 | 0 | 0 | 1 | 1 | 1 | 1 | 1 | 1 | 1 | 1 | 0 | 1 | 0 | 1 | 1 | 0 | 0 | 1 | 0 | 1 | 1 | 1 | 1 | 0.07 | 1.21 | 0.1 | 0.29 | 0.11 |
| 20 | 1 | 0 | 1 | 0 | 1 | 1 | 0 | 1 | 1 | 0 | 1 | 1 | 0 | 0 | 1 | 1 | 1 | 0 | 0 | 1 | 1 | 0 | 1 | 1 | 0.07 | 1.25 | 0.09 | 0.21 | 0.1 |
| 21 | 1 | 0 | 1 | 0 | 1 | 1 | 0 | 1 | 1 | 0 | 1 | 1 | 1 | 0 | 1 | 1 | 0 | 0 | 0 | 1 | 1 | 1 | 1 | 1 | 0.07 | 1.12 | 0.1 | 0.33 | 0.11 |
| 22 | 1 | 0 | 1 | 1 | 0 | 1 | 1 | 1 | 1 | 0 | 0 | 1 | 1 | 1 | 0 | 0 | 1 | 0 | 1 | 1 | 1 | 1 | 1 | 1 | 0.07 | 1.08 | 0.1 | 0.41 | 0.11 |
| 23 | 1 | 0 | 1 | 1 | 1 | 1 | 1 | 1 | 1 | 0 | 1 | 0 | 0 | 1 | 1 | 1 | 0 | 0 | 1 | 1 | 1 | 0 | 1 | 1 | 0.07 | 1.22 | 0.1 | 0.6 | 0.11 |
| 24 | 1 | 1 | 0 | 1 | 1 | 0 | 1 | 1 | 1 | 1 | 1 | 0 | 1 | 1 | 1 | 1 | 0 | 1 | 0 | 0 | 1 | 1 | 1 | 0 | 0.03 | 1.18 | 0.1 | 0.3 | 0.11 |
| 25 | 1 | 1 | 0 | 1 | 1 | 1 | 1 | 1 | 1 | 1 | 0 | 0 | 1 | 1 | 1 | 1 | 1 | 0 | 0 | 1 | 1 | 1 | 1 | 0 | 0.03 | 1.16 | 0.1 | 0.46 | 0.11 |
| 26 | 1 | 1 | 0 | 1 | 1 | 1 | 1 | 1 | 1 | 0 | 0 | 0 | 1 | 1 | 0 | 1 | 1 | 1 | 1 | 0 | 1 | 1 | 1 | 0 | 0.07 | 1.21 | 0.1 | 0.17 | 0.11 |
| 27 | 1 | 1 | 1 | 0 | 1 | 1 | 1 | 1 | 1 | 1 | 0 | 0 | 1 | 1 | 1 | 1 | 0 | 1 | 0 | 0 | 1 | 1 | 1 | 0 | 0.03 | 1.25 | 0.1 | 0.41 | 0.11 |
| 28 | 1 | 1 | 1 | 0 | 0 | 0 | 1 | 0 | 1 | 1 | 0 | 1 | 1 | 0 | 1 | 1 | 1 | 0 | 1 | 1 | 1 | 1 | 1 | 1 | 0.03 | 1.1 | 0.1 | 0.24 | 0.11 |
| 29 | 1 | 1 | 1 | 0 | 0 | 0 | 1 | 0 | 1 | 1 | 0 | 1 | 1 | 0 | 1 | 1 | 0 | 1 | 1 | 1 | 1 | 1 | 1 | 1 | 0.07 | 1.19 | 0.1 | 0.41 | 0.12 |

FIG. 4c

TRANSMISSION METHOD AND FIRST COMMUNICATION DEVICE

CROSS-REFERENCE TO RELATED APPLICATIONS

This application is a continuation application of PCT Application No. PCT/CN2019/128533 filed on Dec. 26, 2019, which claims priority to Chinese Patent Application No. 201910028832.7, filed in China on Jan. 11, 2019, disclosures of which are incorporated herein by reference in their entireties.

TECHNICAL FIELD

Embodiments of this disclosure relate to the field of communication technologies, and in particular, to a transmission method and a first communication device.

BACKGROUND

In new radio (NR) mobile communication systems of the related art, in a case that transmission precoding (also referred to as a discrete Fourier transform spread orthogonal frequency division multiplexing (DFT-s-OFDM) waveform) is employed on a physical uplink shared channel (PUSCH) or a physical uplink control channel (PUCCH), low peak-to-average power ratios (PAPR) of demodulation reference signals (DMRS) are higher than PAPRs of data symbols and uplink coverage performance is poor because a DMRS sequence is generated using a PAPR sequence (also referred to as a Zadoff-Chu (ZC) sequence) or a pseudo-noise (PN) sequence.

SUMMARY

According to a first aspect, an embodiment of this disclosure provides a transmission method, applied to a first communication device. The method includes:

transmitting a target reference signal that belongs to a first type of reference signal in a case that indication information from a second communication device is received and indicates transmission of the first type of reference signal, where a reference signal sequence of the first type of reference signal is generated based on a first characteristic.

According to a second aspect, an embodiment of this disclosure further provides a first communication device. The first communication device includes:

a first transmission module, configured to transmit a target reference signal that belongs to a first type of reference signal in a case that indication information from a second communication device is received and indicates transmission of the first type of reference signal, where a reference signal sequence of the first type of reference signal is generated based on a first characteristic.

According to a third aspect, an embodiment of this disclosure further provides a first communication device. The first communication device includes a processor, a memory, and a computer program stored in the memory and capable of running on the processor, and when the computer program is executed by the processor, the steps of the foregoing transmission method are implemented.

According to a fourth aspect, an embodiment of this disclosure further provides a non-transitory computer-readable storage medium. The non-transitory computer-readable storage medium stores a computer program, and when the computer program is executed by a processor, the steps of the foregoing transmission method are implemented.

BRIEF DESCRIPTION OF DRAWINGS

To describe the technical solutions in the embodiments of this disclosure more clearly, the following briefly introduces the accompanying drawings required for describing the embodiments of this disclosure. Apparently, the accompanying drawings in the following description show merely some embodiments of this disclosure, and a person of ordinary skill in the art may still derive other drawings from these accompanying drawings without creative efforts.

FIG. 2a is a first schematic diagram of CGSs according to an embodiment of this disclosure;

FIG. 2b is a second schematic diagram of CGSs according to an embodiment of this disclosure;

FIG. 2c is a third schematic diagram of CGSs according to an embodiment of this disclosure;

FIG. 3 is a flowchart of a transmission method according to an embodiment of this disclosure;

FIG. 4a is a fourth schematic diagram of CGSs according to an embodiment of this disclosure;

FIG. 4b is a fifth schematic diagram of CGSs according to an embodiment of this disclosure;

FIG. 4c is a sixth schematic diagram of CGSs according to an embodiment of this disclosure;

DESCRIPTION OF EMBODIMENTS

The following clearly describes the technical solutions in the embodiments of this disclosure with reference to the accompanying drawings in the embodiments of this disclosure. Apparently, the described embodiments are merely some rather than all of the embodiments of this disclosure. All other embodiments that a person of ordinary skill in the art obtains without creative efforts based on the embodiments of this disclosure shall fall within the protection scope of this disclosure.

The terms "first", "second", and the like in this application are used to distinguish between similar objects instead of describing a specific order or sequence. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, product, or device. In addition, the use of "and/or" in this application represents presence of at least one of the connected objects. For example, A and/or B and/or C represents the following seven cases: A alone, B alone, C alone, both A and B, both B and C, both A and C, and all of A, B, and C.

For ease of understanding, the following describes some content involved in the embodiments of this disclosure:

In the embodiments of this disclosure, a first communication device may be a terminal, and a second communication device may be a network-side device; or a first communication device may be a network-side device, and a second communication device may be a terminal.

Figure 1:
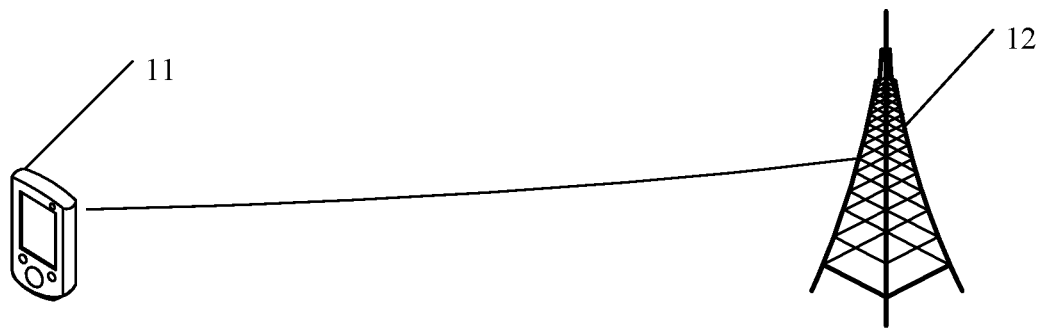
FIG. 1 is a structural diagram of a network system to which an embodiment of this disclosure may be applied.

FIG. 1 is a structural diagram of a network system applicable to an embodiment of this disclosure. As shown in FIG. 1, a terminal 11 and a network-side device 12 are included, and the terminal 11 and the network-side device 12 may communicate with each other.

In this embodiment of this disclosure, the terminal 11 may also be referred to as user equipment (UE). In actual implementation, the terminal 11 may be a terminal-side device such as a mobile phone, a tablet personal computer, a laptop computer, a personal digital assistant (PDA), a mobile Internet device (MID), a wearable device, or an in-vehicle device. It should be noted that a specific type of the terminal 11 is not limited in the embodiments of this disclosure.

The network-side device 12 may be a base station, a relay, an access point, or the like. The base station may be a $5^{th}$ generation (5G) base station or a base station of a later release (for example, a 5G new radio (NR) NodeB (NB)), or a base station in another communication system (for example, an evolved NodeB (eNB)). It should be noted that a specific type of the network-side device 12 is not limited in the embodiments of this disclosure.

In an NR system, in a case that transmission precoding is employed on a PUSCH, a DMRS sequence is generated using a low PAPR sequence (also referred to as a ZC sequence) as follows:

$r(n) = r_{u,v}^{(\alpha,\delta)}(n)$ $n = 0, 1, \ldots, M_{sc}^{PUSCH}/2^{\delta} - 1$ where n represents a DMRS symbol identifier; $\delta=1$; $M_{SC}^{PUSCH}$ represents the number of subcarriers occupied by the PUSCH; $\alpha=0$; and u and v represent values for group hopping and sequence hopping, respectively.

In a case that transmission precoding is employed on a PUCCH, a DMRS sequence is generated using a low PAPR sequence as follows:

$r_l(m) = r_{u,v}^{(\alpha,\delta)}(m)$ $m = 0, 1, \ldots, M_{sc}^{PUCCH,s} - 1$ where $M_{SC}^{PUCCH,s}$ represents the number of subcarriers occupied by the PUCCH.

In a case that a DMRS sequence length is 6, 12, 18, or 24, $r_{u,v}^{(\alpha,\delta)}(n)$ is generated as follows:

$\bar{r}_{u,v}(n) = e^{j\phi(n)\pi/4}, 0 \leq n \leq M_{ZC} - 1$ where $\varphi(n)$ is generated through computer search.

In a case that a DMRS sequence length is 30, $r_{u,v}^{(\alpha,\delta)}(n)$ is generated as follows:

$$\bar{r}_{u,v}(n) = e^{-j\frac{\pi(u+1)(n+1)(n+2)}{31}},$$

$$0 \leq n \leq M_{ZC} - 1$$

In a case that a DMRS sequence length is greater than or equal to 30, $r_{u,v}^{(\alpha,\delta)}(n)$ is generated as follows:

$$x_q(m) = e^{-j\frac{\pi qm(m+1)}{N_{ZC}}} \bar{r}_{u,v}(n) = x_q(n \bmod N_{ZC})$$

where $M_{ZC}$ is the DMRS sequence length; and $N_{ZC}$ is the largest prime number less than $M_{ZC}$.

For computer generated sequences (CGS) in the related art, refer to FIG. 2a to FIG. 2c. In FIG. 2a to FIG. 2c, auto-correlation shift mean may be interpreted as auto correlation shift mean, cross-correlation mean may be interpreted as cross correlation mean, frequency flatness may be interpreted as frequency flatness, the full name of BLER is block error rate, and the full name of SINR is signal-to-interference-plus-noise ratio.

In FIG. 2a to FIG. 2c, parameters in bold mainly have the following problems:

a high PAPR results in limited uplink coverage;

a large cross-correlation value results in high inter-cell interference for users; and zero power in a frequency domain symbol results in decreasing channel estimation performance, which affects a transmission rate.

The following describes the transmission method in the embodiments of this disclosure.

FIG. 3 is a flowchart of a transmission method according to an embodiment of this disclosure. The transmission method in FIG. 3 is applied to a first communication device.

As shown in FIG. 3, the transmission method in this embodiment of this disclosure may include the following step.

Step 301: Transmit a target reference signal that belongs to a first type of reference signal in a case that indication information from a second communication device is received and indicates transmission of the first type of reference signal.

A reference signal sequence of the first type of reference signal is generated based on a first characteristic.

In practical applications, the first communication device may transmit the target reference signal that belongs to the first type of reference signal in a case that transmission precoding is employed on a physical channel or a reference signal, and the indication information indicating transmission of the first type of reference signal is received from the second communication device.

The physical channel may include at least one of a traffic channel, a control channel, and a broadcast channel. The reference signal may at least include at least one of a DMRS and a sounding reference signal (SRS).

Specifically, the traffic channel may include at least one of a PUSCH, a physical downlink shared channel (PDSCH), and a physical sidelink shared channel (PSSCH). The control channel may include at least one of a PUCCH, a physical downlink control channel (PDCCH), and a physical sidelink control channel (PSCCH). The broadcast channel includes at least a physical broadcast channel (PBCH).

In practical applications, in a case that the second communication device is a network-side device, optionally, the indication information is transmitted through radio resource control (RRC) signaling or downlink control information (DCI).

It should be noted that the target reference signal may be any reference signal in a reference signal group corresponding to the first type of reference signal. It should be understood that each reference signal in the reference signal group corresponding to the first type of reference signal corresponds to one reference signal sequence and reference signal symbols.

Optionally, reference signal symbols of the first type of reference signal are generated by performing at least one of π/2 binary phase shift keying (BPSK) modulation, transmission precoding, resource mapping, and inverse fast Fourier transform on the reference signal sequence.

Optionally, the reference signal symbols include:

a first sub-reference signal symbol, where the first sub-reference signal symbol is generated by performing π/2 BPSK modulation on the reference signal sequence; and/or a second sub-reference signal symbol, where the second sub-reference signal symbol is generated by performing π/2 BPSK modulation and transmission precoding on the reference signal sequence.

Optionally, the first characteristic includes at least one of the following: that an auto-correlation value of a first sub-reference signal symbol of the target reference signal is 1;

that an auto-correlation shift mean of a first sub-reference signal symbol of the target reference signal falls within [0, 0.2], where optionally, the auto-correlation shift mean may be 0;

that cross-correlation values of first sub-reference signal symbols of all reference signals in a reference signal group corresponding to the first type of reference signal fall within [0, 0.2], where optionally, the cross-correlation value may be 0;

that a peak-to-average power ratio PAPR value of reference signal symbols of the target reference signal falls within [0 dB, 1.3 dB], where optionally, the PAPR value may be 0;

that a minimum value of a modulus of a second sub-reference signal symbol of the target reference signal is greater than 0.1; and that a difference between a signal-to-interference-plus-noise ratio SINR value corresponding to a first value of a block error rate BLER of the target reference signal, and a mean value of SINR values corresponding to first values of BLERs of all reference signals in a reference signal group corresponding to the first type of reference signal falls within [−0.5 dB, 0.5 dB], where optionally, the difference may be 0.

In a case that the difference between the SINR value corresponding to the first value of the BLER of the target reference signal, and the mean value of the SINR values corresponding to the first values of the BLERs of all the reference signals in the reference signal group corresponding to the first type of reference signal falls within [−0.5 dB, 0.5 dB], demodulation performance of the reference signal sequence of the first type of reference signal is relatively good. In practical applications, the first value may be 0.1 or 0.01, but it is not limited thereto.

It should be noted that when the foregoing values are optional, a PARA of the first type of reference signal can be further reduced, thereby improving transmission performance.

In this embodiment of this disclosure, for a CGS, the reference signal sequence of the first type of reference signal generated based on the first characteristic, reference may be made to FIG. 4a to FIG. 4c. FIG. 4a to FIG. 4c show cross-correlation means with reference CGSs (Cross Correlation Mean with Reference) and reference values.

It can be learned from comparison between CGS performance parameters in FIG. 4a to FIG. 4c and FIG. 2a to FIG. 2c that in terms of PAPR, cross-correlation mean, and frequency flatness, CGSs in FIG. 4c to FIG. 4c are better than CGSs in FIG. 2a to FIG. 2c; and in terms of auto-correlation shift mean, SINR, and BLER, CGSs in FIG. 4c to FIG. 4c are close to CGSs in FIG. 2a to FIG. 2c.

It can be learned that the sequence of the first type of reference signal being generated based on the first characteristic has at least the following effects:

reducing a PAPR of the reference signal and improving uplink coverage performance;

reducing a cross-correlation value and inter-cell interference for users; and increasing symbol power in frequency domain and improving channel estimation performance, thereby increasing a transmission rate.

In this embodiment of this disclosure, optionally, in a case that the first type of reference signal occupies 12 subcarriers, the reference signal sequence includes at least one of the following sequences:

001001010111; 001010110111; 001011010111; 001101010110;
001101101010; 001111101100; 010101101100; 010111101100; 011010010111; 011110010011; 011110111000; 011111101100; 100001111101; 100111101100; 101010010011; 101101001011; 101101010011; 101110000111; 110010010101; 110010101001; 110010101101; 110010110101; 110011101001; 110101101001; 110110101000; 110111101000; 111001001111; 111011000111; 111100001101; and 111100010011.

In FIG. 4a, parameters for sequences corresponding to index numbers 24, 15, 12, 29, 1, 26, 18, 28, 10, 22, 14, 19, and 9 in bold have higher performance than parameters for sequences corresponding to other index numbers in FIG. 4a. In addition, the foregoing listed index numbers are arranged in descending order of performance of the parameters for the sequences corresponding to the foregoing listed index numbers. Specifically, parameters for a sequence corresponding to index number 24 have higher performance than parameters for sequences corresponding to index numbers 15, 12, 29, 1, 26, 18, 28, 10, 22, 14, 19, and 9; parameters for a sequence corresponding to index number 15 have lower performance than the parameters for the sequence corresponding to index number 24, but higher performance than parameters for sequences corresponding to index numbers 12, 29, 1, 26, 18, 28, 10, 22, 14, 19, and 9; and so on.

Therefore, further, in a case that the first type of reference signal occupies 12 subcarriers, the reference signal sequence includes at least one of sequences corresponding to index numbers 24, 15, 12, 29, 1, 26, 18, 28, 10, 22, 14, 19, and 9. Specifically, the reference signal sequence includes at least one of the following sequences:

001010110111; 011110010011; 011110111000; 100001111101; 101010010011; 101101001011; 110010010101; 110010101001; 110011101001; 110110101000; 111001001111; 111100001101; and 111100010011.

Optionally, in a case that the first type of reference signal occupies 18 subcarriers, the reference signal sequence includes at least one of the following sequences:

001001111101101001; 001011010101111001;
001011011011010110; 001011011101111001;
001111111001100001; 010011111101101010;
010100111010110110; 010101110010110110;
010110101001101011; 010110110001101011;
010110110001111011; 010110110010110110;
010111110010110110; 010111111000100011;
011001111100101001; 011011011100101001;
011110110000110110; 011111010000100011;
100100111111000110; 100100111111100110;
101001101101001101; 101001111100101001;
101011000100111101; 101011010110101001;

101101101101001111; 110000101101011110;
110100101010011110; 110101100010110110;
110111000000111110; and 110111000011010110.

In FIG. 4b, parameters for sequences corresponding to index numbers 20, 9, 15, 19, 2, 0, 16, 25, 5, 28, 23, 13, 26, 7, 22, and 4 in bold have higher performance than parameters for sequences corresponding to other index numbers in FIG. 4b. In addition, the foregoing listed index numbers are arranged in descending order of performance of the parameters for the sequences corresponding to the foregoing listed index numbers. Specifically, parameters for a sequence corresponding to index number 20 have higher performance than parameters for sequences corresponding to index numbers 9, 15, 19, 2, 0, 16, 25, 5, 28, 23, 13, 26, 7, 22, and 4; parameters for a sequence corresponding to index number 9 have lower performance than the parameters for the sequence corresponding to index number 20, but higher performance than parameters for sequences corresponding to index numbers 15, 19, 2, 0, 16, 25, 5, 28, 23, 13, 26, 7, 22, and 4; and so on.

Therefore, further, in a case that the first type of reference signal occupies 18 subcarriers, the reference signal sequence includes at least one of sequences corresponding to index numbers 20, 9, 15, 19, 2, 0, 16, 25, 5, 28, 23, 13, 26, 7, 22, and 4. Specifically, the reference signal sequence includes at least one of the following sequences:

001001111101101001; 001011011011010110;
001111111001100001; 010011111101101010;
010101110010110110; 010110110001101011;
010111111000100011; 011011011100101001;
011110110000110110; 100100111111100110;
101001101101001101; 101011000100111101;
101011010110101001; 110000101101011110;
110100101010011110; and 110111000000111110.

Optionally, in a case that the first type of reference signal occupies 24 subcarriers, the reference signal sequence includes at least one of the following sequences:

001111100111101011101011;
011001001111110111101101;
011011111011101101101011;
011011111011101101101101;
011011111111100011101011;
011111000001111101111111;
011111001001110111101011;
011111001011011111100111;
011111011011100101111011;
011111100111011111001011;
011111100111101111100010;
011111100111111111001010;
011111101001110011111011;
011111101011101101101011;
011111101101111111001010;
011111101111101111001010;
011111111011011101001011;
100111110110111011000111;
100111111100110000111111;
100111111100111001011111;
101011011001111100110111;
101011011011011100011111;
101101111100111001011111;
101111111110100111001101;
110110111110111110100110;
110111110100111110100110;
110111111000110111110110;
110111111000110111110110;
110111111100111110100110;
111000101101101101110111; and
111000101101101101111111.

In FIG. 4c, parameters for sequences corresponding to index numbers 9, 17, 20, 1, 24, 28, 21, 12, 23, 26, 2, 22, 4, 16, 18, 14, 5, 0, 8, 7, and 10 in bold have higher performance than parameters for sequences corresponding to other index numbers in FIG. 4c. In addition, the foregoing listed index numbers are arranged in descending order of performance of the parameters for the sequences corresponding to the foregoing listed index numbers. Specifically, parameters for a sequence corresponding to index number 9 have higher performance than parameters for sequences corresponding to index numbers 17, 20, 1, 24, 28, 21, 12, 23, 26, 2, 22, 4, 16, 18, 14, 5, 0, 8, 7, and 10; parameters for a sequence corresponding to index number 17 have lower performance than the parameters for the sequence corresponding to index number 9, but higher performance than parameters for sequences corresponding to index numbers 20, 1, 24, 28, 21, 12, 23, 26, 2, 22, 4, 16, 18, 14, 5, 0, 8, 7, and 10; and so on.

Therefore, further, in a case that the first type of reference signal occupies 24 subcarriers, the reference signal sequence includes at least one of sequences corresponding to index numbers 9, 17, 20, 1, 24, 28, 21, 12, 23, 26, 2, 22, 4, 16, 18, 14, 5, 0, 8, 7, and 10. Specifically, the reference signal sequence includes at least one of the following sequences:

111000101101101101110111;
111000101101101101110111;
111000101101101101110111;
111000101101101101110111;
111000101101101101110111;
111000101101101101110111;
111000101101101101110111;
111000101101101101110111;
111000101101101101110111;
111000101101101101110111;
111000101101101101110111;
111000101101101101110111;
111000101101101101110111;
111000101101101101110111;
111000101101101101110111;
111000101101101101110111;
111000101101101101110111;
111000101101101101110111;
111000101101101101110111;
111000101101101101110111;
111000101101101101110111; and
111000101101101101110111.

In this embodiment of this disclosure, the first communication device may further transmit a second type of reference signal, to improve flexibility of reference signal transmission by the first communication device. Optionally, the method further includes: transmitting a second type of reference signal in a case that a preset condition is met, where a modulation scheme of the second type of reference signal is quadrature phase shift keying (QPSK), 16 quadrature amplitude modulation (QAM), or 64 QAM.

The preset condition includes at least one of the following: that the indication information is not received; that the indication information is received but does not indicate transmission of the first type of reference signal; that a downlink control information DCI format is 0_0 or 1_0; and that a service is a broadcast service.

According to the transmission method in this embodiment, the target reference signal that belongs to the first type of reference signal is transmitted in a case that the indication information from the second communication device is received and the indication information indicates transmission of the first type of reference signal, where the reference signal sequence of the first type of reference signal is generated based on the first characteristic. In this way, a PAPR of the target reference signal transmitted in this embodiment is lower than that in the related art, thereby improving power amplification efficiency of a signal transmit end, reducing power consumption, improving demodulation performance of a signal receive end, and improving uplink coverage.

It should be noted that various optional implementations described in this embodiment of this disclosure may be implemented in combination or may be implemented independently, which is not limited in this embodiment of this disclosure.

Main innovation and protection points of this disclosure are as follows:

In a case that transmission precoding (also referred to as a DFT-s-OFDM waveform) is employed on a traffic channel, a control channel, a broadcast channel, or a reference signal, and a network-side device sends indication information to indicate UE to transmit a target reference signal, a reference signal sequence of the target reference signal is generated based on a first characteristic.

A first sub-reference signal symbol of the target reference signal is generated by performing π/2 BPSK modulation on the reference signal sequence; and a second sub-reference signal symbol of the target reference signal is generated by performing π/2 BPSK modulation and transmission precoding on the reference signal sequence.

The indication information from the network-side device may be indicated through RRC signaling or DCI, and is 1 bit in length.

The first characteristic at least includes:

that an auto-correlation value of a first sub-reference signal symbol of the target reference signal is 1;

that an auto-correlation shift mean of a first sub-reference signal symbol of the target reference signal falls within [0, 0.2];

that cross-correlation values of first sub-reference signal symbols of all reference signals in a reference signal group corresponding to the target reference signal fall within [0, 0.2];

that a dB value range of a PAPR of a time domain symbol corresponding to inverse Fourier transformed reference signal symbols of the target reference signal is [0.8, 1.3];

that a minimum value of a modulus of a second sub-reference signal symbol of the target reference signal is greater than 0.1; and that the reference signal sequence has optimum demodulation performance (for example, having a lowest SINR when a BLER is 0.1 or 0.2).

In a case that a reference signal occupies 6 or 12 or 18 or 24 subcarriers, the reference signal is the target reference signal.

Effects and benefits of this disclosure: This disclosure can resolve a problem that PAPRs of DMRS symbols are higher than PAPRs of data symbols in a case that transmission precoding is employed on a PUSCH or PUCCH, so as to improve power amplification efficiency of a transmit end, reduce power consumption, improve demodulation performance of a receive end, and improve uplink coverage.

Figure 5:
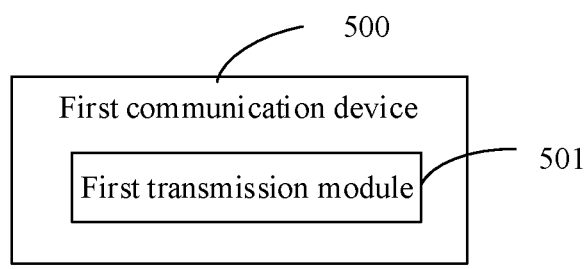
FIG. 5 is a first structural diagram of a first communication device according to an embodiment of this disclosure.

FIG. 5 is a first structural diagram of a first communication device according to an embodiment of this disclosure. As shown in FIG. 5, the first communication device 500 includes:

a first transmission module 501, configured to transmit a target reference signal that belongs to a first type of reference signal in a case that indication information from a second communication device is received and indicates transmission of the first type of reference signal, where a reference signal sequence of the first type of reference signal is generated based on a first characteristic.

Optionally, reference signal symbols of the first type of reference signal are generated by performing at least one of π/2 binary phase shift keying BPSK modulation, transmission precoding, resource mapping, and inverse fast Fourier transform on the reference signal sequence.

Optionally, the reference signal symbols include:

a first sub-reference signal symbol, where the first sub-reference signal symbol is generated by performing π/2 BPSK modulation on the reference signal sequence; and/or a second sub-reference signal symbol, where the second sub-reference signal symbol is generated by performing π/2 BPSK modulation and transmission precoding on the reference signal sequence.

Optionally, the first characteristic includes at least one of the following:

that an auto-correlation value of a first sub-reference signal symbol of the target reference signal is 1;

that an auto-correlation shift mean of a first sub-reference signal symbol of the target reference signal falls within [0, 0.2];

that cross-correlation values of first sub-reference signal symbols of all reference signals in a reference signal group corresponding to the first type of reference signal fall within [0, 0.2];

that a peak-to-average power ratio PAPR value of reference signal symbols of the target reference signal falls within [0 dB, 1.3 dB];

that a minimum value of a modulus of a second sub-reference signal symbol of the target reference signal is greater than 0.1; and that a difference between a signal-to-interference-plus-noise ratio SINR value corresponding to a first value of a block error rate BLER of the target reference signal, and a mean value of SINR values corresponding to first values of BLERs of all reference signals in a reference signal group corresponding to the first type of reference signal falls within [−0.5 dB, 0.5 dB].

Optionally, in a case that the first type of reference signal occupies 12 subcarriers, the reference signal sequence includes at least one of the following sequences:

001001010111; 001010110111; 001011010111; 001101010110; 001101101010; 001111101100; 010101101100; 010111101100; 011010010111; 011110010011; 011110111000; 011111101100; 100001111101; 100111101100; 101010010011; 101101001011; 101101010011; 101110000111; 110010010101; 110010101001; 110010101101; 110010110101; 110011101001; 110101101001; 110110101000; 110111101000; 111001001111; 111011000111; 111100001101; and 111100010011.

Optionally, in a case that the first type of reference signal occupies 18 subcarriers, the reference signal sequence includes at least one of the following sequences:

001001111101101001; 001011010101111001; 001011011011010110; 001011011101111001; 001111111001100001; 010011111101101010; 010100111010110110; 010101110010110110; 010110101001101011; 010110110001101011; 010110110001111011; 010110110010110110; 010111111100110011; 010111111000100011; 011001111100101001; 011011011100101001; 011110110000110110; 011111010010100011; 100100111111000110; 100100111111100110;

101001101101001101; 101001111100101001;
101011000100111101; 101011010110101001;
101101101101001111; 110000101101011110;
110100101010011110; 110101100010110110;
110111000000111110; and 110111000011010110.

Optionally, in a case that the first type of reference signal occupies 24 subcarriers, the reference signal sequence includes at least one of the following sequences:

001111100111101011101011;
011001001111110111101101;
011011111011101101101011;
011011111011101101101101;
011011111111100011101011;
011111000001111101111111;
011111001001110111101011;
011111001011011111100111;
011111101011100101111011;
011111100111011111001011;
011111100111101111100010;
011111100111111111001010;
011111101001110011111011;
011111101011101101101011;
011111101101111111001010;
011111101111101111001010;
011111111011011101001011;
100111110110111011000111;
100111111100110000111111;
100111111100111001011111;
101011011001111100110111;
101011011011011100011111;
101101111100111001011111;
101111111110100111001101;
110110111110111110100110;
110111110100111110100110;
110111111000110111110110;
110111111100111110100110;
111000101101101101110111; and
111000101101101101111111.

Optionally, the first communication device 500 further includes:

a second transmission module, configured to transmit a second type of reference signal in a case that a preset condition is met, where a modulation scheme of the second type of reference signal is quadrature phase shift keying QPSK, 16 quadrature amplitude modulation QAM, or 64 QAM, where the preset condition includes at least one of the following:

that the indication information is not received;

that the indication information is received but does not indicate transmission of the first type of reference signal;

that a downlink control information DCI format is 0_0 or 1_0; and that a service is a broadcast service.

Optionally, the indication information is transmitted through radio resource control RRC signaling or DCI.

The first communication device 500 can implement the processes in the method embodiments of this disclosure, with the same beneficial effects achieved. To avoid repetition, details are not described herein again.

Figure 6:
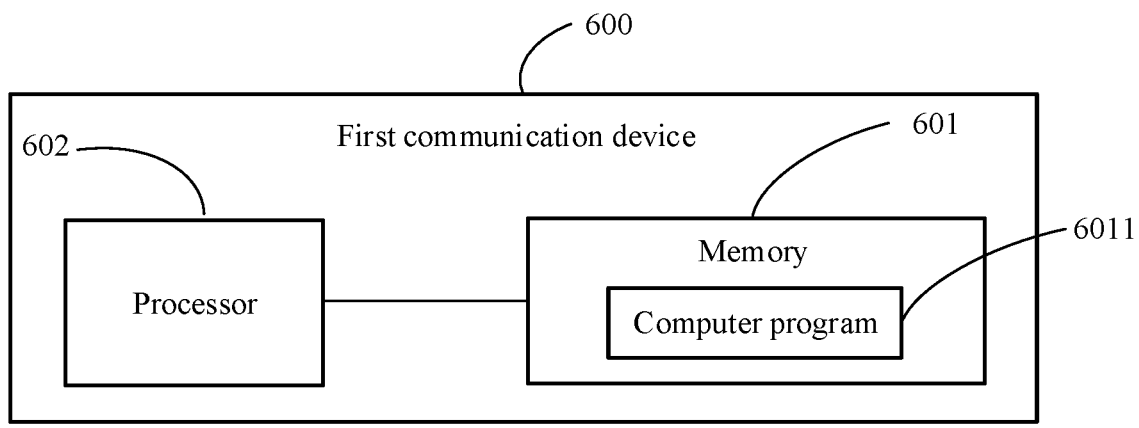
FIG. 6 is a second structural diagram of a first communication device according to an embodiment of this disclosure.

FIG. 6 is a second structural diagram of a first communication device according to an embodiment of this disclosure. As shown in FIG. 6, the first communication device 600 includes a memory 601, a processor 602, and a computer program 6011 stored in the memory 601 and capable of running on the processor 602.

When the computer program 6011 is executed by the processor 602, the following steps are implemented:

transmitting a target reference signal that belongs to a first type of reference signal in a case that indication information from a second communication device is received and indicates transmission of the first type of reference signal, where a reference signal sequence of the first type of reference signal is generated based on a first characteristic.

Optionally, reference signal symbols of the first type of reference signal are generated by performing at least one of π/2 binary phase shift keying BPSK modulation, transmission precoding, resource mapping, and inverse fast Fourier transform on the reference signal sequence.

Optionally, the reference signal symbols include:

a first sub-reference signal symbol, where the first sub-reference signal symbol is generated by performing π/2 BPSK modulation on the reference signal sequence; and/or a second sub-reference signal symbol, where the second sub-reference signal symbol is generated by performing π/2 BPSK modulation and transmission precoding on the reference signal sequence.

Optionally, the first characteristic includes at least one of the following:

that an auto-correlation value of a first sub-reference signal symbol of the target reference signal is 1;

that an auto-correlation shift mean of a first sub-reference signal symbol of the target reference signal falls within [0, 0.2];

that cross-correlation values of first sub-reference signal symbols of all reference signals in a reference signal group corresponding to the first type of reference signal fall within [0, 0.2];

that a peak-to-average power ratio PAPR value of reference signal symbols of the target reference signal falls within [0 dB, 1.3 dB];

that a minimum value of a modulus of a second sub-reference signal symbol of the target reference signal is greater than 0.1; and that a difference between a signal-to-interference-plus-noise ratio SINR value corresponding to a first value of a block error rate BLER of the target reference signal, and a mean value of SINR values corresponding to first values of BLERs of all reference signals in a reference signal group corresponding to the first type of reference signal falls within [−0.5 dB, 0.5 dB].

Optionally, in a case that the first type of reference signal occupies 12 subcarriers, the reference signal sequence includes at least one of the following sequences:

001001010111; 001010110111; 001011010111;
001101010110; 001101101010; 001111101100;
010101101100; 010111101100; 011010010111;
011110010011; 011110111000; 011111101100;
100001111101; 100111101100; 101010010011;
101101001011; 101101010011; 101110000111;
110010010101; 110010101001; 110010101101;
110010110101; 110011101001; 110101101001;
110110101000; 110111101000; 111001001111;
111011000111; 111100001101; and 111100010011.

Optionally, in a case that the first type of reference signal occupies 18 subcarriers, the reference signal sequence includes at least one of the following sequences:

001001111101101001; 001011010101111001;
001011011011010110; 001011011101111001;
001111111001100001; 010011111101101010;
010100111010110110; 010101110010110110;
010101010100110101; 010110110001101011;
010110110001111011; 010110110010110110;
010111110010110110; 010111111000100011;
011001111100101001; 011011011100101001;

011110110000110110;
100100111111000110;
101001101101001101;
101011000100111101;
101101101101001111;
110100101010011110;
110111000000111110; and 011111010010100011;
100100111111100110;
10100111100101001;
101011010110101001;
110000101101011110;
110101100010110110;
110111000011010110.

Optionally, in a case that the first type of reference signal occupies 24 subcarriers, the reference signal sequence includes at least one of the following sequences:
001111100111101011101011;
011001001111110111101101;
011011111011101101101011;
011011111011101101101101;
011011111111100011101011;
011111000001111101111111;
011111001001110111101011;
011111001011011111100111;
011111101011100101111011;
011111100111011111001011;
011111100111101111100010;
011111100111111111001010;
011111101001110011111011;
011111110101011101101011;
011111101101111111001010;
011111101111101111001010;
011111111011011101001011;
100111110110111011000111;
100111111100110000111111;
100111111100111001011111;
101011011001111100110111;
101011011011011100011111;
101101111100111001011111;
101111111110100111001101;
110110111110111110100110;
110111110100111110100110;
110111111000110111110110;
110111111100111110100110;
111000101101101101110111; and
111000101101101101111111.

Optionally, when the computer program 6011 is executed by the processor 602, the following steps may be further implemented:

transmitting a second type of reference signal in a case that a preset condition is met, where a modulation scheme of the second type of reference signal is quadrature phase shift keying QPSK, 16 quadrature amplitude modulation QAM, or 64 QAM, where the preset condition includes at least one of the following:
that the indication information is not received;
that the indication information is received but does not indicate transmission of the first type of reference signal;
that a downlink control information DCI format is 0_0 or 1_0; and that a service is a broadcast service.

Optionally, the indication information is transmitted through radio resource control RRC signaling or DCI.

The first communication device 600 can implement the processes implemented by the first communication device in the foregoing method embodiments. To avoid repetition, details are not described herein again.

An embodiment of this disclosure further provides a computer-readable storage medium, where a computer program is stored in the computer-readable storage medium. When the computer program is executed by a processor, processes of the foregoing transmission method embodiment can be implemented, with the same technical effects achieved. To avoid repetition, details are not described herein again. For example, the computer-readable storage medium is a read-only memory (ROM), a random access memory (RAM), a magnetic disk, an optical disc, or the like.

It should be noted that in this specification, the terms "include" and "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In absence of more constraints, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is an example implementation. Based on such an understanding, the technical solutions of this disclosure essentially or a part thereof that contributes to related technologies may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use a different method to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described again herein.

In the embodiments provided in this application, it should be understood that the disclosed apparatus and method may be implemented in other manners. For example, the described apparatus embodiments are merely examples. For example, the unit division is merely logical function division and may be other division in actual implementation. For example, a plurality of units or components may be combined or integrated into another system, or some elements may be ignored or may not be performed. In addition, the displayed or discussed mutual couplings or direct couplings or communication connections may be indirect couplings or communication connections through some interfaces, apparatuses or units, and may be implemented in electrical, mechanical, or other forms.

The units described as separate parts may or may not be physically separate, and parts displayed as units may or may not be physical units, and may be located in one position or distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as a separate product, the functions may be stored in a computer-readable storage medium. Based on such an understanding, the technical solutions of this disclosure essentially, or the part contributing to related technologies, or some of the technical solutions may be embodied in a form of a software product. The computer software product is stored in a storage medium, and includes instructions for enabling a computer device (which may be a personal computer, a server, a network device, or the like) to perform all or some of the steps of the methods described in the embodiments of this disclosure. The foregoing storage medium includes: any medium that can store program code, such as a USB flash drive, a removable hard disk, a ROM, a RAM, a magnetic disk, or an optical disc.

A person of ordinary skill in the art may understand that all or some of the processes of the methods in the embodiments may be implemented by a computer program controlling relevant hardware. The program may be stored in a computer-readable storage medium. When the program runs, the processes of the methods in the embodiments are performed. The foregoing storage medium may be a magnetic disk, an optical disc, a read-only memory (ROM), a random access memory (RAM), or the like.

It can be understood that the embodiments described in the embodiments of this disclosure may be implemented by hardware, software, firmware, middleware, microcode, or a combination thereof. For hardware implementation, the processing unit may be implemented in one or more application-specific integrated circuits (ASIC), digital signal processors (DSP), digital signal processing devices (DSPD), programmable logic devices (PLD), field-programmable gate arrays (FPGA), general-purpose processors, controllers, microcontrollers, microprocessors, and other electronic units for performing the functions described in this disclosure, or a combination thereof.

For software implementation, the techniques described in the embodiments of this disclosure may be implemented by modules (for example, procedures or functions) that perform the functions described in the embodiments of this disclosure. Software code may be stored in the memory and executed by the processor. The memory may be implemented in or outside the processor.

The embodiments of this disclosure are described above with reference to the accompanying drawings, but this disclosure is not limited to the foregoing implementations. The foregoing implementations are only illustrative rather than restrictive. Inspired by this disclosure, a person of ordinary skill in the art can still derive many variations without departing from the essence of this disclosure and the protection scope of the claims. All these variations shall fall within the protection of this disclosure.

What is claimed is:

1. A transmission method, applied to a first communication device, comprising:
    transmitting a target reference signal that belongs to a first type of reference signal in a case that indication information from a second communication device is received and indicates transmission of the first type of reference signal, wherein,
    a reference signal sequence of the first type of reference signal is generated based on a first characteristic,
    wherein, the first type of reference signal occupies 12 subcarriers, the reference signal sequence comprises at least one of the following sequences:
    101101001011,
    110010101001,
    110110101000;
    or,
    wherein, the first type of reference signal occupies 18 subcarriers, the reference signal sequence comprises at least one of the following sequences:
    010101110010110110,
    010110110001101011,
    110100101010011110;
    or,
    wherein, the first type of reference signal occupies 24 subcarriers, the reference signal sequence comprises at least one of the following sequences:
    011001001111110111101101,
    100111110110111011000111,
    101011011001111100110111,
    101111111110100111001101.

2. The method according to claim 1, wherein reference signal symbols of the first type of reference signal are generated by performing at least one of $\pi/2$ binary phase shift keying (BPSK) modulation, transmission precoding, resource mapping, and inverse fast Fourier transform on the reference signal sequence.

3. The method according to claim 2, wherein the reference signal symbols comprise:
    a first sub-reference signal symbol, wherein the first sub-reference signal symbol is generated by performing $\pi/2$ BPSK modulation on the reference signal sequence; and/or
    a second sub-reference signal symbol, wherein the second sub-reference signal symbol is generated by performing $\pi/2$ BPSK modulation and transmission precoding on the reference signal sequence.

4. The method according to claim 1, wherein the first characteristic comprises at least one of the following:
    that an auto-correlation value of a first sub-reference signal symbol of the target reference signal is 1;
    that an auto-correlation shift mean of a first sub-reference signal symbol of the target reference signal falls within [0, 0.2];
    that cross-correlation values of first sub-reference signal symbols of all reference signals in a reference signal group corresponding to the first type of reference signal fall within [0, 0.2];
    that a peak-to-average power ratio (PAPR) value of reference signal symbols of the target reference signal falls within [0 dB, 1.3 dB];
    that a minimum value of a modulus of a second sub-reference signal symbol of the target reference signal is greater than 0.1; and
    that a difference between a signal-to-interference-plus-noise ratio (SINR) value corresponding to a first value of a block error rate (BLER) of the target reference signal, and a mean value of SINR values corresponding to first values of BLERs of all reference signals in a reference signal group corresponding to the first type of reference signal falls within [−0.5 dB, 0.5 dB].

5. The method according to claim 1, wherein the first type of reference signal occupies 12 subcarriers, the reference signal sequence further comprises at least one of the following sequences:

001001010111; 001010110111; 001011010111; 001101010110; 001101101010; 001111101100; 010101101100; 010111101100; 011010010111; 011110010011; 011110111000; 011111101100; 100001111101; 100111101100; 101010010011; 101101010011; 101110000111; 110010010101; 110010101101; 110010110101; 110011101001; 110101101001; 110111101000; 111001001111; 111011000111; 111100001101; and 111100010011.

6. The method according to claim 1, wherein the first type of reference signal occupies 18 subcarriers, the reference signal sequence further comprises at least one of the following sequences:
001001111101101001; 001011010101111001; 001011011011010110; 001011011101111001; 001111111001100001; 010011111101101010; 010100111010110110; 010110101001101011; 010110110001111011; 010110110010110110; 010111110010110110; 010111111000100011; 011001111100101001; 011011011100101001; 011110110000110110; 011111010010100011; 100100111111000110; 100100111111100110; 101001101101001101; 101001111110010001; 101011000100111101; 101101101101001111; 110000101101011110; 110100101010011110; 110101100010110110; 110111000000111110; and 110111000011010110.

7. The method according to claim 1, wherein the first type of reference signal occupies 24 subcarriers, the reference signal sequence further comprises at least one of the following sequences:
001111100111101011101011;
011011111011101101101011;
011011111011101101101101;
011011111111100011101011;
011111000001111101111111;
011111001001110111101011;
011111001011011111100111;
011111011011100101111011;
011111100111011111001011;
011111100111101111100010;
011111001111111111001010;
011111101001110011111011;
011111101011101101101011;
011111101101111111001010;
011111101111101111001010;
011111111011011101001011;
100111111100110000111111;
100111111100111001011111;
101011011001111100110111;
101011011011011100011111;
101101111100111001011111;
110110111110111110100110;
110111110100111110100110;
110111111000110111110110;
110111111100111110100110;
111000101101101101110111; and
111000101101101101111111.

8. The method according to claim 1, further comprising: transmitting a second type of reference signal in a case that a preset condition is met, wherein a modulation scheme of the second type of reference signal is quadrature phase shift keying (QPSK), 16 quadrature amplitude modulation (QAM), or 64 QAM, wherein the preset condition comprises at least one of the following:

that the indication information is not received;
that the indication information is received but does not indicate transmission of the first type of reference signal;
that a downlink control information (DCI) format is 0_0 or 1_0; and
that a service is a broadcast service.

9. The method according to claim 1, wherein the indication information is transmitted through radio resource control (RRC) signaling or downlink control information (DCI).

10. A first communication device, comprising a processor, a memory, and a computer program stored in the memory and executable by the processor, wherein when the computer program is executed by the processor, a transmission method is implemented, and the transmission method comprises:
transmitting a target reference signal that belongs to a first type of reference signal in a case that indication information from a second communication device is received and indicates transmission of the first type of reference signal, wherein
a reference signal sequence of the first type of reference signal is generated based on a first characteristic,
wherein, the first type of reference signal occupies 12 subcarriers, the reference signal sequence comprises at least one of the following sequences:
101101001011,
110010101001,
110110101000;
or,
wherein, the first type of reference signal occupies 18 subcarriers, the reference signal sequence comprises at least one of the following sequences:
010101110010110110,
010110110001101011,
110100101010011110;
or,
wherein, the first type of reference signal occupies 24 subcarriers, the reference signal sequence comprises at least one of the following sequences:
011001001111110111101101,
100111110110111011000111,
101011011001111100110111,
101111111110100111001101.

11. The first communication device according to claim 10, wherein reference signal symbols of the first type of reference signal are generated by performing at least one of π/2 binary phase shift keying (BPSK) modulation, transmission precoding, resource mapping, and inverse fast Fourier transform on the reference signal sequence.

12. The first communication device according to claim 11, wherein the reference signal symbols comprise:
a first sub-reference signal symbol, wherein the first sub-reference signal symbol is generated by performing π/2 BPSK modulation on the reference signal sequence; and/or
a second sub-reference signal symbol, wherein the second sub-reference signal symbol is generated by performing π/2 BPSK modulation and transmission precoding on the reference signal sequence.

13. The first communication device according to claim 10, wherein the first characteristic comprises at least one of the following:
that an auto-correlation value of a first sub-reference signal symbol of the target reference signal is 1;
that an auto-correlation shift mean of a first sub-reference signal symbol of the target reference signal falls within [0, 0.2];

that cross-correlation values of first sub-reference signal symbols of all reference signals in a reference signal group corresponding to the first type of reference signal fall within [0, 0.2];

that a peak-to-average power ratio (PAPR) value of reference signal symbols of the target reference signal falls within [0 dB, 1.3 dB];

that a minimum value of a modulus of a second sub-reference signal symbol of the target reference signal is greater than 0.1; and that a difference between a signal-to-interference-plus-noise ratio (SINR) value corresponding to a first value of a block error rate (BLER) of the target reference signal, and a mean value of SINR values corresponding to first values of BLERs of all reference signals in a reference signal group corresponding to the first type of reference signal falls within [−0.5 dB, 0.5 dB].

14. The first communication device according to claim 10, wherein the first type of reference signal occupies 12 subcarriers, the reference signal sequence further comprises at least one of the following sequences:

001001010111; 001010110111; 001011010111;
001101010110; 001101101010; 001111101100;
010101101100; 010111101100; 011010010111;
011110010011; 011110111000; 011111101100;
100001111101; 100111101100; 101010010011;
101101010011; 101110000111; 110010010101;
110010101101; 110010110101; 110011101001;
110101101001; 110111101000; 111001001111;
111011000111; 111100001101; and 111100010011.

15. The first communication device according to claim 10, wherein the first type of reference signal occupies 18 subcarriers, the reference signal sequence further comprises at least one of the following sequences:

001001111101101001; 001011010101111001;
001011011011010110; 001011011101111001;
001111111001100001; 010011111101101010;
010100111010110110; 010110101001101011;
010110110001111011; 010110110010110110;
010111110010110110; 010111111000100011;
011001111100101001; 011011011100101001;
011110110000110110; 011111010010100011;
100100111111000110; 100100111111100110;
101001101101001101; 101001111100101001;
101011000100111101; 101011010110101001;
101101101101001111; 110000101101011110;
110101100010110110; 110111000000111110; and
110111000011010110.

16. The first communication device according to claim 10, wherein the first type of reference signal occupies 24 subcarriers, the reference signal sequence further comprises at least one of the following sequences:

001111001110101101011;
011011110111011011011;
011011110111011011101;
011011111111100011101011;
011111000001111101111111;
011111001001110111101011;
011111001011011111100111;
011111011011100101111011;
011111100111011111001011;
011111100111101111100010;
011111100111111111001011;
011111101001110011111011;
011111101011101101101011;
011111101101111111001010;
011111101111101111001010;

01111111101101111001011;
100111111100110000111111;
100111111100111001011111;
101011011011011100011111;
101101111100111001011111;
110110111110111110100110;
110111110100111110100110;
110111111000110111110110;
110111111100111110100110;
111000101101101101110111; and
111000101101101101111111.

17. The first communication device according to claim 10, wherein the transmission method further comprises:

transmitting a second type of reference signal in a case that a preset condition is met, wherein a modulation scheme of the second type of reference signal is quadrature phase shift keying (QPSK), 16 quadrature amplitude modulation (QAM), or 64 QAM, wherein the preset condition comprises at least one of the following:

that the indication information is not received;

that the indication information is received but does not indicate transmission of the first type of reference signal;

that a downlink control information (DCI) format is 0_0 or 1_0; and that a service is a broadcast service.

18. The first communication device according to claim 10, wherein the indication information is transmitted through radio resource control (RRC) signaling or downlink control information (DCI).

19. A non-transitory computer-readable storage medium, wherein the non-transitory computer-readable storage medium stores a computer program, and when the computer program is executed by a processor, the steps of a transmission method is implemented, and the transmission method comprises:

transmitting a target reference signal that belongs to a first type of reference signal in a case that indication information from a second communication device is received and indicates transmission of the first type of reference signal, wherein a reference signal sequence of the first type of reference signal is generated based on a first characteristic, wherein, the first type of reference signal occupies 12 subcarriers, the reference signal sequence comprises at least one of the following sequences:

101101001011,
110010101001,
110110101000;

or, wherein, the first type of reference signal occupies 18 subcarriers, the reference signal sequence comprises at least one of the following sequences:

010101110010110110,
010110110001101011,
110100101010011110;

or, wherein, the first type of reference signal occupies 24 subcarriers, the reference signal sequence comprises at least one of the following sequences:

011001001111110111101101,
100111110110111011000111,
101011011001111100110111,
101111111110100111001101.

20. The non-transitory computer-readable storage medium according to claim 19, wherein reference signal symbols of the first type of reference signal are generated by performing at least one of π/2 binary phase shift keying (BPSK) modulation, transmission precoding, resource mapping, and inverse fast Fourier transform on the reference signal sequence.

\* \* \* \* \*